Sept. 13, 1966    T. BUDZICH    3,272,276
FLUID POWER SYNCHRONIZED DRIVES FOR VEHICLES
Filed April 17, 1964    2 Sheets-Sheet 1

INVENTOR
TADEUSZ BUDZICH
BY William N. Hogg
ATTORNEY

Sept. 13, 1966  T. BUDZICH  3,272,276
FLUID POWER SYNCHRONIZED DRIVES FOR VEHICLES
Filed April 17, 1964  2 Sheets-Sheet 2

INVENTOR
TADEUSZ BUDZICH
BY William N. Hogg
ATTORNEY

3,272,276
FLUID POWER SYNCHRONIZED DRIVES FOR VEHICLES
Tadeusz Budzich, 3344 Colwyn Road, Cleveland, Ohio
Filed Apr. 17, 1964, Ser. No. 360,534
10 Claims. (Cl. 180—44)

This invention in general aspects relates to power drives of self-propelled vehicles, and more particularly to power drives for the front wheels of tractors, self-propelled farm machinery, earth-moving equipment, and the like.

In still more particular aspects, this invention relates to fluid power drives for self-propelled vehicles.

In even more particular aspects, this invention relates to fluid front axle power drives and the synchronization and control of the fluid front-axle drive with the other axles that are driven through a conventional mechanical train.

With conventional four-wheel drive tractors and the like, the front wheels are driven by conventional gear-reduction units through a mechanical differential drivingly connected to an internal combustion engine or other prime mover. The steering requirement necessitating free suspension of the front wheels makes these mechanical drive arrangements costly and very complicated. Mechanical drives for this purpose also suffer from the additional serious disadvantage that, since the front and back wheels of the vehicle are integrated into a single mechanical drive, each individual wheel of this drive, for the purpose of maximum drive efficiency, must be completely synchronized with respect to the ground surface. The ground configuration or difference in the loaded radii of the individual wheels which may be caused by a change in the weight of the vehicle, a change in the air pressure in the tires, or actual wear of the tread of the tires, will produce a relative slipping motion between the ground and the tire surface. This brings the drive out of synchronization. Only the rolling motion, without wheel slip, signifies the maximum tractive efficiency of the drive. Under a condition of tire slip, resulting with a mechanical front wheel drive, engine power will be wasted and accelerated severe wear of the tires will take place.

Assume that the loaded radius of the front tires of a tractor are decreased by either mounting a front implement on the tractor or by loss of pressure in the tires. For any specific distance travelled by the tractor, the linear distance covered by the back wheels will be larger than that covered by the front wheels. Since the back and front wheels are connected by the tractor frame, the back wheels will slip and the front wheels will be dragged through a percentage of the distance equivalent to the difference in the loaded radii from the ideal condition of no slip. The disadvantage of this parasitic effect is self-evident. Furthermore, the engagement and disengagement of the mechanical front wheel drive required for example during gear-changing operations becomes quite complicated. The known fluid drives for front axle steering wheels, employing a variable displacement pump equipped with an automatic control that continually changes pump displacement to maintain a relatively constant output pressure, provide the answer to the synchronization problem but suffer from certain additional disadvantages. An automatic pump control of this type will move the pump into minimum displacement position upon an increase in the discharge pressure and will maintain this relatively high discharge pressure. In this condition the pump losses are quite high. The lowering of the system pressure will bring the pump into maximum displacement position, causing high throttling losses, due to circulation of a large volume of fluid through the pump and motor passages.

It is therefore a principal object of this invention to provide an improved control system for use with front-wheel fluid synchronized power drives in which an automatically controlled fluid pump supplies power to fluid motors, mounted on the front wheels, synchonizing them for maximum efficiency with the mechanical drive.

Another object of this invention is to provide an improved control system for a front wheel fluid drive that is synchronized with the mechanical drive by a variable flow fluid pump equipped with an automatic pressure responsive control that is arranged to vary the fluid flow to maintain a constant system pressure and therefore to maintain a constant tractive effort of the front wheel drive.

Still another object of this invention is to provide an unloading control for a fluid pressure control system used with a fluid front wheel drive that will override the automatic pressure responsive control when the pump is working in an unloaded condition at a minimum power input.

A further object of this invention is to provide a control system having fluid-operated power-engaging and disengaging devices interposed between the fluid motors and wheels driven thereby to permit engagement and disengagement of the wheels from the fluid power drive.

An additional object of this invention is to provide a front-wheel synchronized fluid power transmission and control system which permits complete synchonization of the fluid drive with the mechanical drive by means of an automatic pump control that maintains a constant system pressure, an unloading control to bring the fluid pump into a condition of minimum flow and minimum pumping pressure, and fluid-operated engaging and disengaging devices between the fluid motors and front wheels which will engage and disengage the front wheels and the fluid motors by the use of the pump unloading control.

A still further object of this invention is to provide a control for a fluid power transmission system in which the pump unloading control can be activated by a dual control signal, which permits selective disengagement of the fluid transmission from the front wheels.

Further objects and advantages of the invention will become apparent from the following description and drawings in which.

Figure 1:
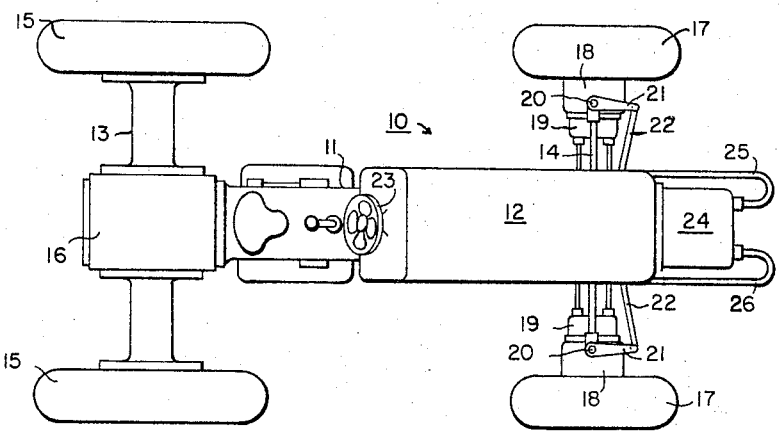
FIGURE 1 is a diagrammatic plan view of a tractor showing the mounting of fluid motors and a representative mounting of a fluid pump.

Although the invention has broader application, it will be described hereinafter in specific relation to a tractor, which presently constitutes the preferred use. Referring now to the drawings and for the present to FIGURE 1, a tractor generally designated as 10 is shown which includes a frame 11 mounting an engine 12, back axle 13, and front axle 14. Rear wheels 15 are mounted on the back axle 13 and are drivingly connected with engine 12 by a mechanical transmission 16. Steering front wheels 17 are provided and are equipped with a mechanical gear reducer 18 mounting fluid motors 19. The combination of front steering wheels 17, gear reducers 18, and fluid motors 19 are pivotally mounted by kingpin 20 in respect to front axle 14. A conventional steering arm 21 through a tie rod 22 connects the front steering wheels 17 to tractor steering wheel 23. A variable flow pump, generally designated as 24, is driven by the engine 12 and is connected through flexible ducts 25 and 26 to fluid motors 19. As shown in FIGURE 1, the variable flow pump 24 is directly mounted on the engine although it can be mounted at any suitable power take-off.

Figure 3:
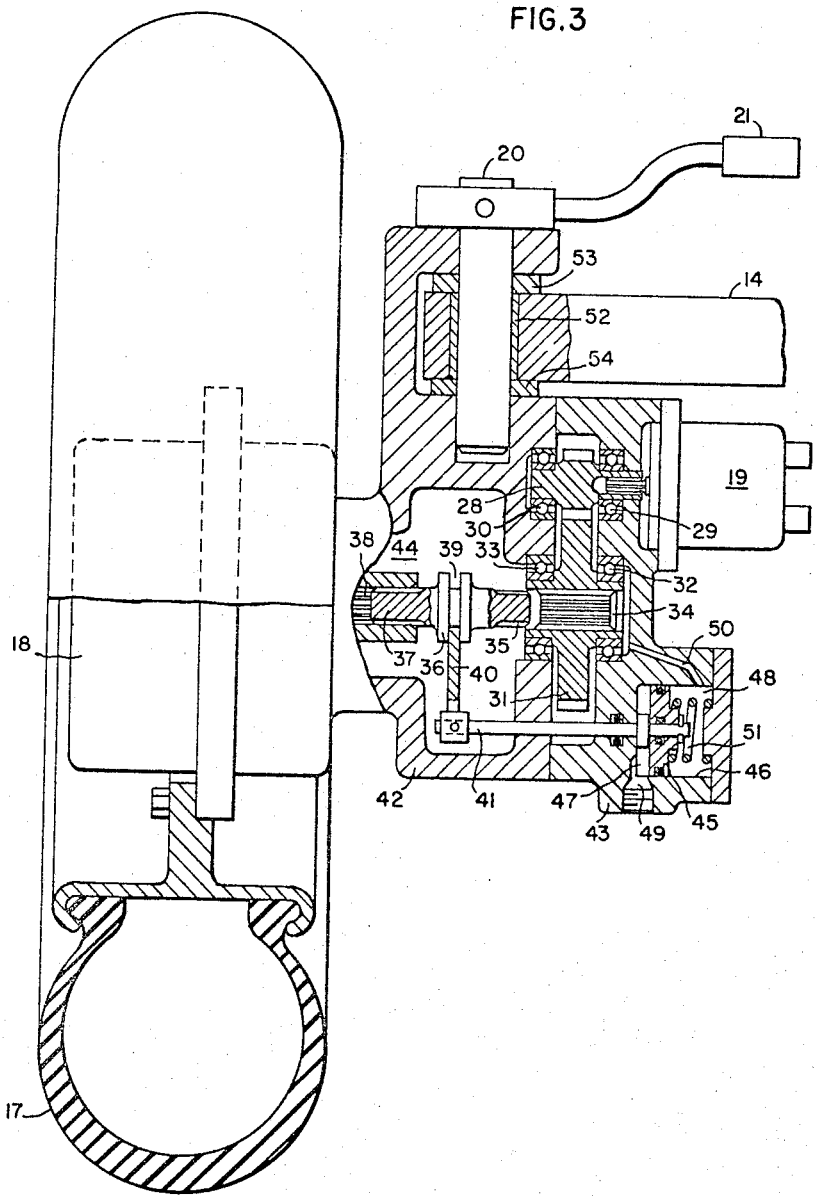
FIGURE 3 shows a sectional view through the gear drive and fluid operated clutch of this invention.

As can be seen from a study of FIGURE 1, the apparatus of FIGURE 3, which is now to be described, is duplicated at each steering wheel 17 of the tractor. Consequently, a single showing and description of the like apparatus is deemed sufficient. Fluid motor 19 is drivingly connected to a pinion 28 journalled by bearings 29 and 30. The pinion 28 meshes with a gear 31 journalled in bearings 32 and 33. The gear 31 is equipped with an internal spline 34 which can be selectively engaged by external spline 35 of dog clutch 36. The dog clutch 36 with an additional external spline 37 slidably engages internal spline 38 of mechanical gear reducer 18. The dog clutch 36 is equipped with a circumferential slot 39 engaging fork 40 of actuating shaft 41. The dog clutch actuating shaft 41 is slidably mounted in housing 42 that is provided with a cover 43. This housing and cover enclose the pinion 28 and gear 31 and define a low pressure space 44. The dog clutch actuating shaft 41 terminates in piston 45, slidably mounted within a cylinder 46 formed in cover 43. The cylinder 46 is functionally divided by piston 45 into zones 47 and 48. Zone 47 communicates with port 49. The zone 48 through passage 50 communicates with low pressure space 44. A dog clutch spring 51 biases piston 45, dog clutch actuating shaft 41, fork 40, and dog clutch 36 toward a position of drive disengagement between front steering mechanical gear reducer 18, and fluid motor 19.

The housing 42 is pivotally mounted in respect to front axle 14 by kingpin 20 working in bearings 52, 53, and 54 to provide for movement during steering.

Figure 2:
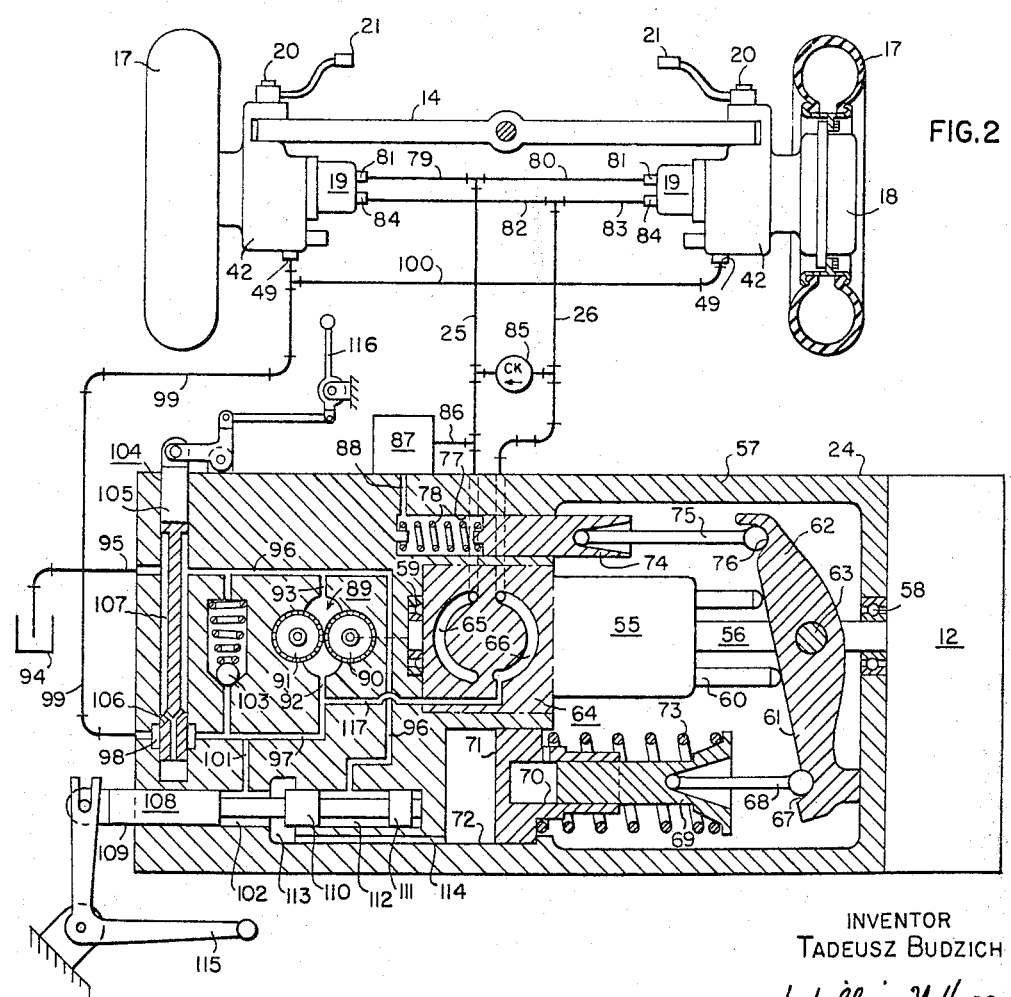
FIGURE 2 is a somewhat schematic representation of the fluid drive components of this invention with diagrammatically shown variable displacement pump and pump control components.

Referring now to FIGURE 2, the variable flow pump, generally designated as 24, is shown with its working components disposed diagrammatically. The rotary motion from engine 12 is transmitted to cylinder barrel 55 by shaft 56, journalled in pump housing 57 by bearings 58 and 59. The cylinder barrel 55 is equipped with cylinder bores (not shown) reciprocably guiding pistons 60, which pistons abut reaction surface 61 of trunnion 62. The trunnion 62 is mounted for limited rotation in respect to pump housing 57 by trunnion pin 63. The cylinder barrel 55 abuts valve plate 64 (diagrammatically shown rotated 90 degrees for clarity of explanation) which valve plate has a high-pressure timing port 65, and a low-pressure timing port 66. The trunnion 62 has an internal spherical surface 67 engaging a first push rod 68, which push rod engages a spring guide 69. The spring guide 69 is slidably disposed in bore 70 of unloading piston 71. The unloading piston 71 is guided in an unloading bore 72. A control spring 73 is interposed between spring guide 69 and unloading piston 71 and through push rod 68 biases the trunnion 62 toward the position of its maximum angular inclination and thus maximum pump output. A control piston 74 is guided in a control bore 77 of the pump housing 57 and engages through a second push rod 75 internal spherical surface 76 of pump trunnion 62. The control bore 77 contains a reaction spring 78 biasing the control piston 74 and push rod 75 toward engagement with trunnion 62.

The high pressure timing port 65 is connected through flexible duct 25 and ducts 79 and 80 with high pressure ports 81 of fluid motors 19. The low pressure timing port 66 is connected through flexible duct 26 and ducts 82 and 83 with low pressure ports 84 of the fluid motors 19. A conventional check valve 85 functionally connects in one direction flexible duct 26 to duct 25 while preventing flow from flexible duct 25 to duct 26. The flexible duct 25 conducts pressure fluid from high pressure timing port 65 through passage 86 to automatic pressure-responsive pump control 87. The control 87 is connected through passage 88 with the control cylinder 77. The pressure-responsive pump control 87 may be any of the well known types having a pressure responsive valve which is operative when the fluid delivered by the pump reaches a predetermined pressure to admit fluid under pressure to a pressure responsive piston that serves to rotate the pump trunnion in a direction suitable to reduce the volume of fluid delivered by the pump, such as disclosed in United States patent application, Serial No. 221,747, filed September 6, 1962.

A fixed displacement gear pump is provided generally designated at 89 and has a driving gear 90 and driven gear 91. The driving gear 90 is drivingly connected to shaft 56. The gear pump 89 has an outlet port 92 and inlet port 93. The inlet port 93 is connected to diagrammatically shown reservoir 94 by line 95 and passage 96. The outlet port 92 is connected through passage 97, annular space 98, line 99, and line 100 with ports 49 which ports communicate with zone 47 (see FIGURE 3). Also the outlet port 92 is connected through passage 101 with annular space 102, and with low pressure timing port 66 through passage 117. The latter connection permits positive pressurization of the low pressure branch of the fluid transmission, and prevents cavitation of the pump. The passages 96 and 97 communicating with pump ports 93 and 92 respectively are functionally inter-connected by a relief valve 103. A selector valve spool 104 is provided and equipped with lands 105 and 106 defining annular space 107 therebetween. Also an unloading valve spool 108 is provided which is equipped with lands 109, 110 and 111 defining annular space 102 between lands 109 and 110, and annular space 112 between lands 110 and 111. An annular space 113 surrounds the spool 108 and is in direct communication with annular space 102 and is connected through passage 114 with the unloading bore 72. The unloading valve spool 108 is actuated by a lever 115, and selector valve spool 104 is actuated by a lever 116.

With respect to the operation of the apparatus hereinabove described, rotary motion, generated by the engine 12, is transmitted by the shaft 56 to cylinder barrel 55 and causes the pistons 60 to reciprocate as they follow the inclined surface 61 of trunnion 62. This reciprocating motion will induce a pumping action, which in a well-known manner is phased by the high pressure timing port 65 and low pressure timing port 66 of the valve plate 64. The magnitude of the pressure flow generated within the cylinder barrel 55 is proportional to the angle of inclination of the reaction surface 61 of trunnion 62 in respect to the axis of rotation of shaft 56 as is well known. With the reaction surface 61 perpendicular to the axis of rotation of the pump, the pump flow becomes zero; with the maximum angle of inclination, as shown in FIGURE 2, the pump volume output is at its maximum during pumping. The high pressure fluid from the high pressure timing port 65 is transmitted through high pressure flexible duct 25, ducts 79 and 80, high pressure ports 81 to the fluid motors 19. The flow of high pressure fluid will generate rotary motion in the fluid motors 19 in a well-known manner. This rotation is transmitted to pinion 28 and gear 31 (see FIGURE 3). With external spline 35 of dog clutch 36 engaging internal spline 34 of gear 31, the rotary motion of gear 31 is transmitted through dog clutch 36 to the mechanical gear reduction 18 and wheel 17. The high pressure fluid, after performing work in driving wheels 17, is exhausted from low pressure ports 84 and through ducts 82 and 83 and low pressure flexible duct 26 and returns to low pressure timing port 66. With this arrangement, the speed of rotation of the front wheels 17 is dictated by the surface speed of the tractor which is driven by the rear wheels 15, connected through mechanical transmission 16 with the engine 12. The driving power and the torque developed in the fluid motors is transmitted to the steering wheels 17 and helps to propel the tractor. The speed of rotation of the steering wheels 17 is solely dictated by the speed of rotation of rear wheels 15. Both the rear wheels 15 and steering wheels 17 are therefore functionally synchronized by the ground surface. Therefore, the higher the surface speed of the tractor the higher the speed of rotation of the steering wheels 17 and the larger the flow of high pressure fluid required by the fluid motors 19. Control of the fluid flow is accomplished by changing the angle of inclination of the trunnion 62, the angle being regulated by the action of the control spring 73, control piston 74, and automatic pressure responsive pump control 87. The control spring 73, acting through spring guide 69 and push rod 68, biases the trunnion 62 toward the maximum pump flow position. A pressure signal, supplied from automatic pressure responsive control 87, transmitted through passage 88 to control cylinder 77, will react on the cross-section area of control piston 74 applying force thereto. This force, transmitted to trunnion 62 by push rod 75, will tend to overcome the bias of the control spring 73 (which is maintained in a preloaded position by unloading piston 71) and rotate the trunnion 62 around trunnion pin 63 toward the position of zero pump displacement. The automatic pressure responsive control 87 is arranged to supply a modulated control signal which will vary the angle of inclination of trunnion 62 and therefore volume output of the pump to maintain a relatively constant high pressure timing port 65.

The rotation of the pump shaft 56 is transmitted through a mechanical connection, not shown, to the gears 90 and 91 of gear pump 89 which will generate the flow of pressure fluid. It is assumed as previously described that the direction of rotation of the gear pump 89 is such that pump port 93 will be the low pressure suction port and pump port 92 will be the pressure discharge port. The discharge port 92 and the suction port 93 are functionally interconnected by conventional relief valve 103, which, in a well known manner, is going to by-pass excess fluid from passage 97 to passage 96 to maintain a relatively constant pressure in passage 97 equal to the load setting of the relief valve. The fluid under pressure from passage 97 is transmitted through passage 101 to annular space 102, annular ring 113, passage 114 and thence to unloading cylinder 72 where it reacts on the cross-section area of the unloading piston 71 to maintain spring 73 in a preloaded position as previously stated. The low pressure port 93 of the gear pump is connected through passage 96 to annular space 112 defined by lands 110 and 111 of unloading valve spool 108. Movement of the unloading valve spool 108 from right to left as viewed in FIGURE 2, will connect unloading cylinder 72 to passage 96 and therefore pump inlet port 93. Under the action of the control spring 73 and reaction spring 78, the unloading piston 71 will be moved from right to left, bringing the trunnion 62 into zero flow position. Movement of the unloading valve spool 108 by the operation of lever 115 to the position, shown in FIGURE 2, will admit pressure fluid to unloading cylinder 72. Unloading piston 71 will compress control spring 73, activating the control mechanism of the variable displacement pump and therefore activating the fluid drive motors 19 of the tractor steering wheels. As shown in FIGURE 2, the discharge port 92 of the gear pump is also connected through annular space 98, lines 99 and 100, to ports 49. The pressure fluid supplied therefrom to zone 47 (see FIGURE 3) reacts against the cross-sectional area of piston 45. The force generated thereby will move piston 45 against the bias of the dog clutch spring 51, and, through dog clutch actuating shaft 41 and fork 40, will move dog clutch 36 from left to right (as viewed in FIGURE 3), engaging the external spline 35 with internal spline 34 of gear 31. When zone 47 is subject to low pressure, the biasing force of dog clutch spring 51 will move the dog clutch 36 from right to left (as viewed in FIGURE 3) to a drive disengagement position, which is the position shown in FIGURE 3. The movement through the operation of lever 116 of the selector valve spool 104 downward from the position shown in FIGURE 2 will connect gear pump discharge port 92 through annular space 98, space 107 to passage 96 and pump suction port 93, at the same time connecting it through line 95 to reservoir 94. Under these conditions the gear pump 89 becomes unloaded and will not generate any appreciable pressure. The resulting pressure drop in the discharge port 92 will simultaneously, in the manner described above, disengage dog clutch 36 and at the same time by dropping the pressure in the unloading cylinder 72 permit unloading piston 71 to bring the trunnion 62 into zero flow position, thus unloading the pump. As described above, with the selector spool 104 in the position shown in FIGURE 2, movement of the lever 115 will activate or deactivate the unloading mechanism of the variable displacement pump, while the dog clutches maintain the fluid motors in driving engagement with the steering wheels 17. Movement of the lever 116 will activate or deactivate, simultaneously, the dog clutches and the variable flow pump unloading control 87.

During operation of a tractor, the fluid drive of the steering wheels when connected is usually maintained for a considerable period of time. However, during this time, the torque supplied to the tractor steering wheels by the fluid transmission must be terminated during the declutching and gear-changing operations of the mechanical transmission, which of course occur very often during normal operation of a tractor. Termination of the driving power to the steering wheels during these operations may be effected by continual disengagement of the dog clutches; however, this subjects these clutches and the associated drive to extreme wear. This is avoided by the present invention in that the automatic pressure-responsive pump control may be overridden to bring the variable-flow-pump trunion to the zero pump output position. Consequently, operation of the fluid motors and thus the transmission of driving power to the steering wheels ceases while the dog clutches remain engaged. This action is achieved by the operation of the lever 115. Of course, when required, the fluid drive may be disengaged by the operation of the separate control provided by lever 116. As described hereinabove, the operation of lever 116 disengages the dog clutch and simultaneously causes the trunion of the variable flow pump to be rotated to the position of zero pump output. Hence, when power transmission to the steering wheels is not desired, fluid losses of the variable flow pump are kept to a minimum.

While one embodiment of the invention has been shown and described herein, it is obvious that other adaptations and modifcations may be made without departing from the scope and spirit of the appended claims.

What is claimed is:

1. In a self-propelled vehicle having a frame, an engine and driving wheels mounted on said frame, driving means interposed between said engine and said driving wheels, at least one steering wheel pivotally mounted on said frame; the combination therewith of a fluid power transmission and control system disposed to drive each of said steering wheels comprising, fluid motor means mounted on said steering wheels and drivingly engaged therewith, fluid responsive clutch means interposed between said fluid motor means and said steering wheels, a variable flow pump having high and low pressure ports connected to said motor means and arranged to drive said fluid motor means, pressure responsive control means to vary the flow of said pump to maintain a relatively constant system pressure, unloading means to selectively unload said pressure responsive control means and bring said pump into condition of minimum flow and pressure, a source of control pressure disposed to operate said unloading means and said clutch means, and fluid pressure transmitting means functionally interconnecting said source of control pressure and said unloading means, whereby activation of said unloading means will bring said variable flow pump into unloaded minimum power loss condition.

2. The combination of claim 1 further characterized by said source of control pressure having selector valve means to lower the pressure of said source of control pressure to activate said unloading means and said clutch means, thereby unloading said variable flow pump and disconnecting said fluid motors from said steering wheels.

3. The device of claim 1 further characterized by said source of control pressure having a second pump, said second pump including inlet and outlet ports, a pressure limiting by-pass means functionally interconnecting said inlet and outlet ports, duct means between said outlet port and said low pressure port of said variable pump and said unloading means, whereby said second pump will supply control fluid at a relatively constant pressure to said low pressure port and said unloading means.

4. The combination of claim 3 further characterized by unloading control valving means positioned between said source of control pressure and said unloading means, said unloading control valving means arranged to selectively connect said unloading means with said inlet port and said outlet port of said second pump, whereby the variable flow pump can be unloaded and activated while said clutch means drivingly connect said fluid motors to said front steering wheels.

5. In a self-propelled vehicle having a frame, an engine and driving wheels mounted on said frame, driving means interposed between said engine and said driving wheels, steering wheels pivotally mounted on said frame, the combination therewith of a fluid power transmission and control system interposed between said engine and said steering wheels comprising, fluid motors mounted on said steering wheels and drivingly engaged therewith, fluid responsive clutch means interposed between said fluid motors and said steering wheels, said clutch means having clutch spring means biasing said clutch means toward a position of drive disengagement and fluid piston means arranged to move said clutch means toward a drive engaging position, a variable flow pump driven by said engine, high and low pressure duct means connecting said variable flow pump and said fluid motors, said variable flow pump having a flow changing mechanism, control spring means biasing said flow changing mechanism toward a position of maximum flow, fluid actuating means arranged to urge said flow changing mechanism toward a position of minimum flow and pressure responsive control means to supply a pressure signal to said fluid actuating means to vary the flow of said variable flow pump to maintain a constant system pressure, a second fluid pump driven by said engine and having inlet and outlet ports, duct means between the outlet port of said second pump and said fluid piston means, and selector valve means positioned between said inlet and outlet ports of said second pump and disposed to selectively connect said inlet and outlet ports of said second pump to reduce the pressure at said outlet port of said second pump thereby permitting said clutch spring means to disconnect said clutch means to disconnect said fluid motors from said steering wheels.

6. The combination of claim 5 further characterized by means for connecting said outlet port of second pump to said low pressure duct means.

7. In a self-propelled vehicle having a frame, an engine and driving wheels mounted on said frame, driving means interposed between said engine and said driving wheels, steering wheels pivotally mounted on said frame, the combination therewith of a fluid power transmission and control system interposed between said engine and said steering wheels comprising, fluid motors mounted on said steering wheels and drivingly engaged therewith, fluid responsive clutch means interposed between said fluid motors and said steering wheels, said clutch means having clutch spring means biasing said clutch means toward a position of disengagement and fluid piston means arranged to move said clutch means toward a drive engaging position, a variable flow pump driven by said engine, high and low pressure duct means connecting said variable flow pump and said fluid motors, said variable flow pump having a flow changing mechanism, control spring means biasing said flow changing mechanism toward a position of maximum flow, fluid actuating means arranged to urge said flow changing mechanism toward a position of minimum flow, and pressure responsive control means to supply a pressure signal to said fluid actuating means to vary the flow of said variable flow pump to maintain a constant system pressure, a second fluid pump driven by said engine and having inlet and outlet ports, first duct means connecting said outlet port of said second pump and said fluid piston means, second duct means between said outlet port of said second pump and said control spring means, actuating piston means interposed between said second duct means and said control spring means, and unloading control valving means positioned between said outlet port of said second pump and said actuating piston means arranged to selectively connect said actuating piston means with said inlet port and said outlet port of said second pump, whereby the variable flow pump can be unloaded and activated while said clutch means drivingly connect said fluid motors to said steering wheels.

8. The combination of claim 7 further characterized by means for connecting said outlet port of said second pump to said low pressure duct means.

9. In a self-propelled vehicle having a frame, an engine and driving wheels mounted on said frame, driving means interposed between said engine and said driving wheels, steering wheels pivotally mounted on said frame; the combination therewith of a fluid power transmission and control system interposed between said engine and said steering wheels comprising, fluid motors mounted on said steering wheels and drivingly engaged therewith, fluid responsive clutch means interposed between said fluid motors and said steering wheels, said clutch means having clutch spring means biasing said clutch means toward a position of drive disengagement and fluid piston means arranged to move said clutch means toward a drive engaging position, a variable flow pump driven by said engine, high and low pressure duct means connecting said variable flow pump and said fluid motors, said variable flow pump having a flow changing mechanism, control spring means biasing said flow changing mechanism toward a position of maximum flow, fluid actuating means arranged to urge said flow changing mechanism toward a position of minimum flow and pressure responsive control means to supply a pressure signal to said fluid actuating means to vary the flow of said variable flow pump to maintain a constant system pressure, a second fluid pump driven by said engine and having inlet and outlet ports, first duct means connecting said outlet port of said second pump and said fluid piston means, second duct means between said outlet port of said second pump and said control spring means, actuating piston means interposed between said second duct means and said control spring means, selector valve means positioned between said inlet and outlet ports of said second pump and disposed to selectively connect said inlet and outlet ports to reduce the pressure at said outlet port thereby permitting said clutch spring means to disconnect said clutch means to disconnect said fluid motors from said steering wheels, and unloading control valving means positioned between said outlet port of said second pump and said actuating piston means arranged to selectively connect said actuating piston means with said inlet port and said outlet port of said second pump, whereby the variable flow pump can be unloaded and activated while said clutch means drivingly connect said fluid motors to said steering wheels.

10. The combination of claim 9 further characterized by means for connecting said outlet port of said second pump to said low pressure duct means.

References Cited by the Examiner

UNITED STATES PATENTS 2,913,061  11/1959  Beyerstedt et al. _____ 180—51
3,053,043   9/1962  Knowler _____ 180—66 X

FOREIGN PATENTS 791,903  3/1958  Great Britain.

BENJAMIN HERSH, *Primary Examiner.*

M. L. SMITH, *Assistant Examiner.*